United States Patent [19]
Schmid et al.

[11] Patent Number: 5,958,125
[45] Date of Patent: *Sep. 28, 1999

[54] GONIOCHROMATIC LUSTER PIGMENTS BASED ON TRANSPARENT, NONMETALLIC, PLATELET-SHAPED SUBSTRATES

[76] Inventors: Raimund Schmid, Im Falkenhorst 1, 67435 Neustadt; Norbert Mronga, Ringstr 2, 69221 Dossenheim, both of Germany

[*] Notice: This patent issued on a continued prosecution application filed under 37 CFR 1.53(d), and is subject to the twenty year patent term provisions of 35 U.S.C. 154(a)(2).

[21] Appl. No.: 08/675,834

[22] Filed: Jul. 5, 1996

[51] Int. Cl.$^6$ ............... C04B 14/20; C09C 1/62
[52] U.S. Cl. ............ 106/417; 106/415; 106/436; 106/438; 106/439; 106/441; 106/442; 106/443; 106/444; 106/446; 106/449; 106/450; 106/451; 106/454; 106/453; 106/457; 106/459; 106/456; 106/461; 106/462; 106/466; 106/479
[58] Field of Search ............... 106/403, 404, 106/415, 417, 456, 479, 459, 436, 442, 443, 446, 450, 453, 454, 457, 444, 438, 439, 449, 462, 466, 441, 451, 461; 428/363, 403, 404

[56] References Cited

U.S. PATENT DOCUMENTS

| | | | |
|---|---|---|---|
| 3,438,796 | 4/1969 | Hanke . | |
| 4,168,986 | 9/1979 | Venis, Jr. . | |
| 5,135,812 | 8/1992 | Phillips et al. . | |
| 5,364,467 | 11/1994 | Schmid et al. | 106/450 |
| 5,540,770 | 7/1996 | Schmid et al. | 106/417 |
| 5,573,584 | 11/1996 | Ostertag et al. | 106/417 |
| 5,607,504 | 3/1997 | Schmid et al. | 106/456 |
| 5,624,486 | 4/1997 | Schmid et al. | 106/417 |
| 5,733,364 | 3/1998 | Schmid et al. | 106/417 |

FOREIGN PATENT DOCUMENTS

| | | |
|---|---|---|
| 0 014 382 | 8/1980 | European Pat. Off. . |
| 0 033 457 | 8/1981 | European Pat. Off. . |
| 0 045 851 | 2/1982 | European Pat. Off. . |
| 0 068 311 | 1/1983 | European Pat. Off. . |
| 0 265 280 | 4/1988 | European Pat. Off. . |
| 0 265 820 | 5/1988 | European Pat. Off. . |
| 0 315 849 | 5/1989 | European Pat. Off. . |
| 0 332 071 | 9/1989 | European Pat. Off. . |
| 0 338 428 | 10/1989 | European Pat. Off. . |
| 0 353 544 | 2/1990 | European Pat. Off. . |
| 0 499 864 | 8/1992 | European Pat. Off. . |
| 0 579 091 | 1/1994 | European Pat. Off. . |
| 0 595 131 | 5/1994 | European Pat. Off. . |
| 43 40 141 | 6/1995 | Germany . |
| 44 05 492 | 8/1995 | Germany . |
| 44 14 079 | 10/1995 | Germany . |
| 44 37 753 | 4/1996 | Germany . |
| 195 11 696 | 10/1996 | Germany . |
| 195 11 697 | 10/1996 | Germany . |
| 195 15 988 | 11/1996 | Germany . |
| 195 16 181 | 11/1996 | Germany . |
| 6 093 206 | 4/1994 | Japan . |
| WO 93/08237 | 4/1993 | WIPO . |
| WO 93/12182 | 6/1993 | WIPO . |

*Primary Examiner*—Michael Marcheschi
*Attorney, Agent, or Firm*—Kenyon & Kenyon

[57] ABSTRACT

Goniochromatic luster pigments based on multiply coated, high refractive, nonmetallic, platelet-shaped substrates which are at least partially transparent to visible light, comprising at least one layer packet of A) a colorless coating having a refractive index $n \leq 1.8$ and B) a reflecting, selectively or nonselectively absorbing coating which is at least partially transparent to visible light, and also, if desired, additionally C) an outer protective layer, and their use for coloring paints, inks, including printing inks, plastics, glasses, ceramic products and decorative cosmetic preparations.

26 Claims, No Drawings

GONIOCHROMATIC LUSTER PIGMENTS BASED ON TRANSPARENT, NONMETALLIC, PLATELET-SHAPED SUBSTRATES

The present invention relates to novel goniochromatic luster pigments based on multiply coated, high refractive, nonmetallic, platelet-shaped substrates which are at least partially transparent to visible light, comprising at least one layer packet of A) a colorless coating having a refractive index $n \leq 1.8$ and B) a reflecting, selectively or nonselectively absorbing coating which is at least partially transparent to visible light, and also, if desired, additionally C) an outer protective layer, and to their use for coloring paints, inks, including printing inks, plastics, glasses, ceramic products and decorative cosmetic preparations.

Luster effect pigments are used in many sectors of industry, for example in automotive coatings, decorative coating, plastics pigmentation, paints, printing inks, especially security printing inks, and cosmetics.

Their optical effect is based on the directed reflection of light at predominantly sheetlike, mutually parallel-oriented, metallic or strongly refractive pigment particles. Depending on the composition of the pigment platelets, interference, reflection and absorption phenomena create angle-dependent color and lightness effects.

Owing to their uncopyable optical effects, these pigments are becoming increasingly important for the production of counterfeit-proof security documents, such as banknotes, checks, check cards, credit cards, tax stamps, postage stamps, rail and air tickets, telephone cards, lottery tickets, gift vouchers, passes and identity cards.

Markings prepared with luster effect pigments and the absence of these markings or their alteration, for example in a color copy (disappearance of color flops and luster effects), are reliably discernible by the unaided, naked eye and so make it easy to distinguish the copy from the original.

Goniochromatic luster pigments, which exhibit an angle-dependent color change between a plurality of intensive interference colors and are of particular interest because of their color play, have hitherto only been known on the basis of multiply coated, platelet-shaped metallic substrates.

U.S. Pat. No. 3,438,796 and 5,135,812 describe for example metallic luster pigments comprising a central opaque aluminum film coated on both sides alternatingly with dielectric low refractive films (silicon dioxide, magnesium fluoride) and transparent metal films (aluminum, chromium). Owing to their additionally very complicated manufacture (alternate vapor deposition of the various film materials on a substrate foil in a high vacuum, removing the foil from the vapor-deposited multilayered film and its comminution to pigment particle size), the central metal film of these pigments is coated only on the platelet top and bottom surfaces.

DE-A-4,405,492 and DE-A-4,437,753, which were unpublished at the priority date of the present invention, and German Patent Applications 19516181.5 and 19515988.8 disclose goniochromatic luster pigments produced by coating metal platelets (in particular aluminum platelets) by CVD (chemical vapor deposition) processes or wet-chemically with low refractive metal oxide layers (in particular $SiO_2$) and nonselectively absorbing metal, metal oxide and/or metal sulfide layers or selectively absorbing, high refractive metal oxide layers.

It is true that metal-based luster pigments have good application properties, including good hiding power, but the use in a varnish, for example, results in a "harsh" metallic luster which may not always be desired.

Luster pigments based on transparent, platelet-shaped substrates that do not exhibit this harsh metallic luster are described for example in WO-A-93/12182, which concerns mica platelets coated with a high refractive metal oxide layer (in particular titanium dioxide) and a nonselectively absorbing layer. These pigments exhibit in plan view, depending on the $TiO_2$ layer thickness, a certain interference color which becomes increasingly weaker with an increasingly flat viewing angle and finally turns gray or black. This is in fact not the result of a change in the hue of the interference color, but only the result of a decrease in the intensity (saturation) of the color.

Silicon dioxide platelet luster pigments expensively produced by applying a waterglass solution to a substrate tape, gelling, drying, detaching, washing out of the salts and comminuting the "$SiO_2$ film" are known from WO-A-93/8237. Coloring the $SiO_2$ film with organic or inorganic pigments and coating the added-colorant $SiO_2$ platelets with $SnO_2$-containing titanium dioxide gives pigments which, depending on the angle, exhibit either the interference color or the body color of the pigment.

Finally, JP-A-93206/1992 describes luster pigments based on glass flakes coated with an opaque metal layer and alternating $SiO_2$ and $TiO_2$ layers, which luster pigments resemble metallic luster pigments.

It is an object of the present invention to provide further goniochromatic luster pigments which shall have advantageous application properties and be preparable in an economical manner.

We have found that this object is achieved by the goniochromatic luster pigments defined at the beginning, which are useful for coloring coatings, inks, including printing inks, plastics, glasses, ceramic products and decorative cosmetic preparations.

The goniochromatic luster pigments of the present invention are notable for high refractive, nonmetallic, platelet-shaped substrates which are at least partially transparent to visible light.

For the purposes of the present invention, "at least partially transparent to visible light" means that the substrate generally transmits at least 10%, preferably at least 30%, of the incident light.

Suitable substrate materials are (semi)transparent materials which are intrinsically high refractive, ie. have a refractive index of generally $\geq 2$, preferably $\geq 2.4$, or are intrinsically only low refractive and have been provided with a high refractive, light-transmitting coating.

Examples of particularly suitable intrinsically high refractive materials are in particular platelet-shaped iron oxides, preferably platelet-shaped iron(III) oxide $\alpha$-$Fe_2O_3$ doped with silicon (EP-A-14 382), aluminum (EP-A-68 311) or aluminum and manganese (EP-A-265 820), and also platelet-shaped bismuth oxychloride BiOCl (EP-A-315 849). In principle, it is also possible to use platelet-shaped titanium dioxide and zirconium dioxide, but these materials are costly to produce (U.S. Pat. No. 4,168,986).

Examples of particularly suitable, intrinsically low refractive materials coated with high refractive material are in particular silicatic platelets coated with a high refractive metal oxide layer. Silicatic platelets are in particular light-colored or white micas, and flakes of preferably wet-ground muscovite are particularly preferred. Of course, it is also possible to use other natural micas such as phlogopite and biotite, artificial micas, talc and glass flakes.

The metal oxide coating of the silicatic platelets can be constructed from colorless high refractive metal oxides such as titanium, zirconium, zinc and tin oxides and bismuth oxychloride and absorbing high refractive metal oxides such as iron and chromium oxides, ilmenite or else mixtures of these oxides. Aluminum oxide and silicon oxide may likewise be present, albeit in a minor amount.

Particularly preferred substrate materials are mica platelets comprising an oxide coating which consists essentially of titanium dioxide and contains only small amounts (generally<5% by weight) of further, preferably colorless, metal oxides. Such pigments are generally known and commercially available under the names IRIODIN® (Merck, Darmstadt), FLONAC® (Kemira Oy, Pori) or MEARLIN® (Mearl Corporation, New York).

The thickness of the $TiO_2$ layer (geometric layer thickness) is customarily from 10 to 300 nm, preferably from 20 to 200 nm. With particular advantage it is also possible to use mica pigments having only thin $TiO_2$ coatings (from about 20 to 40 nm) as substrates.

Also of particular interest for use as substrate material are titania-coated mica pigments whose $TiO_2$ coating is partially reduced and which as well as unchanged $TiO_2$ contains reduced titanium species having oxidation states from <4 to 2 (lower oxides such as $Ti_3O_5$, $Ti_2O_3$ through TiO, titanium oxynitrides and also titanium nitride). The reduced pigments are more color-intensive than the unreduced, $TiO_2$-coated pigments, and as the degree of reduction increases their body color shifts in the direction of the absorption color of the reduction products of titanium, ie. into the blue to violet hue range. Their preparation can be effected, as is known, by reduction with ammonia, hydrogen and also hydrocarbons and hydrocarbon/ammonia mixtures (cf. EP-A-332 071 and German Patent Applications 1951696.8 and 19511697.6 and the reference cited therein), in which case the pigments reduced in the presence of hydrocarbons generally also contain carbon.

The size of the substrate particles in the luster pigments of the present invention is not critical per se and can be adapted to the particular application. Generally, the platelet-shaped particles have average largest diameters of from about 1 to 200 $\mu$m, in particular of from about 5 to 100 $\mu$m, and thicknesses of from about 0.1 to 1 $\mu$m, in particular about 0.3 $\mu$m. Their specific free surface area (BET) is customarily within the range from 1 to 15 $m^2/g$, in particular within the range from 1 to 12 $m^2/g$.

The luster pigments of this invention have a colorless, low refractive coating (A) in combination with a reflective coating (B) which can be selectively absorbing or nonselectively absorbing but in any case shall be at least partially transparent to visible light. They may contain a plurality of identical or different combinations (layer packets) of (A)+(B), but preference is given to coating with only one layer packet (A)+(B). Additionally, to protect the underlying layer (B), an outer layer (C) may be applied.

The low refractive coating (A) generally has a refractive index $n \leq 1.8$, preferably $\leq 1.6$.

Suitable for use as the layer material (A) is any low refractive colorless substance which can be applied as a durable film to the substrate particles.

Particularly suitable examples besides magnesium fluoride and aluminum phosphate are in particular metal oxides such as silicon oxide, silicon oxide hydrate, aluminum oxide, aluminum oxide hydrate and mixtures thereof, of which silicon oxide (hydrate) is preferred.

The thickness of the coatings (A) is generally from 20 to 800 nm, preferably from 50 to 600 nm. Since the layer (A) essentially determines the interference colors of the pigments of this invention, it has a minimum thickness of about 100 nm in luster pigments which have only one layer packet (A)+(B) and exhibit a particularly pronounced color play and hence are also preferred. If a plurality (eg. 2, 3 or 4) of layer packets (A)+(B) are present, the thickness of (A) is preferably within the range from 50 to 300 nm.

Suitable substances for the reflecting coating (B) include not only high refractive, selectively or nonselectively absorbing substances but also low refractive, nonselectively absorbing substances having a high absorption constant, which must of course also be depositable as a durable film.

Examples of high refractive materials suitable for coating (B) are nonselectively absorbing materials such as metals, metal oxides, metal sulfides and mixtures thereof, which may also contain selectively absorbing metal oxides in a minor amount, and selectively absorbing materials such as, in particular, metal oxides, which generally each have a refractive index $n \geq 2.0$, preferably $n \geq 2.4$.

Specific examples of nonselectively absorbing high refractive materials suitable for coating (B) are:

metals which can be applied by gas phase decomposition of volatile metal compounds, such as particularly preferably molybdenum, preferably iron, tungsten and chromium, also cobalt and nickel, and also mixtures thereof; metals which can be deposited wet-chemically by reduction of metal salt solutions, such as silver, copper, gold, palladium and platinum and also cobalt and nickel and alloys such as NiP, NiB, NiCo, NiWP, CoP and AgAu;

metal oxides such as preferably magnetite $Fe_3O_4$, cobalt oxide (CoO, $Co_3O_4$) and vanadium oxide ($VO_2$, $V_2O_3$) and also mixtures of these oxides with the metals, such as in particular magnetite and iron;

metal sulfides such as particularly preferably molybdenum sulfide, preferably iron sulfide, tungsten sulfide and chromium sulfide, also cobalt sulfide and nickel sulfide and also mixtures of these sulfides such as $MOS_2/WS_2$ and in particular mixtures of these sulfides with the respective metal, such as in particular $MOS_2$ and molybdenum, and mixtures with oxides of the respective metal, such as $MOS_2$ and molybdenum oxides.

Also suitable for use as nonselectively absorbing high refractive coating (B) are for example layers of colorless high refractive materials such as zirconium dioxide and in particular titanium dioxide incorporating nonselectively absorbing (black) material (eg. carbon) or coated therewith (EP-A-499 864).

Examples of selectively absorbing high refractive layer materials (B) are in particular colored oxides such as preferably iron(III) oxide ($\alpha$- and $\gamma$-$Fe_2O_3$, red), chromium(III) oxide (green), titanium(III) oxide ($Ti_2O_3$, blue) and also vanadium pentoxide (orange) as well as colored nitrides such as preferably titanium oxynitrides and titanium nitride ($TiO_xN_y$, TiN, blue), the lower titanium oxides and nitrides generally being present in a mixture with titanium dioxide.

Here it is of course also possible to use colorless high refractive materials, for example metal oxides such as zirconium dioxide, in particular titanium dioxide, which have been colored with selectively absorbing colorants, by incorporation of colorants in the metal oxide layer, by doping thereof with selectively absorbing metal cations or by coating the metal oxide layer with a film containing a colorant (cf. DE-A-4,437,753, unpublished at the priority date of the present invention).

Finally, suitable low refractive, nonselectively absorbing materials having a high absorption constant for use as coating (B) are in particular metals such as aluminum.

The coating (B) should of course not be opaque, but be at least partially transparent (semitransparent) to visible light and its thickness therefore differs as a function of the optical properties of the chosen layer materials.

The layer thickness of coating (B) in the case of nonselectively absorbing high refractive materials such as metals, black metal oxides and sulfides is generally within the range from 1 to 100 nm, preferably within the range from about 1 to 25 nm for strongly absorbing metals such as molybdenum and chromium, within the range from about 10 to 50 nm for less strongly absorbing materials such as magnetite, and preferably within the range from 5 to 20 nm in the case of metal-sulfide-containing materials such as $MoS_2$-containing layers.

In the case of colored high refractive metal oxide coatings (B) the layer thickness is customarily within the range from 1 to 500 nm, preferably from 10 to 150 nm.

Low refractive, but strongly absorbing aluminum layers (B) are finally generally from 1 to 25 nm, preferably from 5 to 20 nm, thick.

If a plurality of layer packets (A)+(B) are present, the layer thickness of coating (B) is customarily reduced by from about 50 to 75%.

The coating of the high refractive, (semi)transparent substrates with the low refractive layer (A) produces a pigment which exhibits a series of interference colors which are determined by the optical properties of the substrate (absorbing/nonabsorbing).

Nonabsorbing (colorless) high refractive substrates may, if of appropriate layer thickness (from about 40 to 160 nm), have interference colors intrinsically. A coating with (A) continues the interference series at the point determined by the starting material, and the interference color becomes more angle-dependent at the same time.

If, for example, silvery $TiO_2$-coated mica platelets or silvery BiOCl platelets are coated with silicon dioxide, the interference colors blue, green, gold and red become repeatedly observable in succession with increasing $SiO_2$ layer thickness in a plan view of the dry pigment powder. A pigment which reflects blue in plan view exhibits for example a red color at a flatter viewing angle.

However, the interference colors of the nonabsorbing substrates coated with (A) are visible only in the dry state, ie. in the pigment powder, and completely disappear in the moist state or in a varnish.

Additional coating with a nonselectively absorbing layer (B), for example with molybdenum, causes the interference colors to be equally enhanced for each hue and to remain visible even in a varnish.

Applying a selectively absorbing (colored) layer (B) enhances in particular the interference colors which come close to the absorption color of (B), while deviating interference colors are diminished. For instance, a very suitable choice is iron(III) oxide for red to golden interference colors, chromium(III) oxide for green interference colors, and reduced titanium dioxide, especially ammonia-reduced titanium dioxide, for blue interference colors.

In the case of absorbing (semi)transparent substrates, a distinction has to be made between nonselectively absorbing and selectively absorbing materials.

Nonselectively absorbing substrates appear dark away from the specular angle. Here suitable substrates are for example silvery $TiO_2$-coated micas which have been reduced with hydrogen at 800° C. and which, owing to formation of reduced titanium oxides, exhibit reduced light transmissivity coupled with a virtually unchanged silvery luster, and micas coated with $TiO_2$ doped with carbon black.

Nonselectively absorbing substrates exhibit more intensive interference colors in air than nonabsorbing substrates when coated with layer (A).

As with the transparent substrates, interference colors of nonselectively absorbing substrates become visible in a varnish on coating with layer (B), and selectively absorbing layers (B) can be reconformed to the interference colors of the substrate coated with (A).

In the case of selectively absorbing (colored) substrates such as platelet-shaped iron oxides, mica platelets coated with iron(III) oxide, and ammonia-reduced (blue) $TiO_2$-coated mica platelets, the absorption color of the substrate mixes with the interference system produced when coating with layer (A).

For instance, (A)-coated hematite platelets ($\alpha$-$Fe_2O_3$, red) and $Fe_2O_3$-containing micas show a series of strongly angle-dependent, high-brilliance interference colors in the greenish golden to bluish red hue range, whereas green and blue hues are diminished by the substrate absorbing in this range. Conversely, blue reduced $TiO_2$-coated mica platelets give rise to particularly brilliant interference colors in the blue to green hue range.

An enhancement of the interference colors can in turn be effected by coating with layer (B), in which case preference among the selectively absorbing substrates is given to selectively absorbing layers (B) which, as described above, can be conformed to the interference colors of the pigment (hence to the absorption color of the substrate).

Finally, the luster pigments of this invention may additionally include an outer layer (C), in particular for protecting essentially metallic layers (B), or layers (B) containing reduced (low valence) metal oxides, underneath.

Said layer (C) can be constructed from low refractive or high refractive metal oxides which can be not only colorless but also selectively absorbing. Examples of suitable metal oxides include silicon oxide, silicon oxide hydrate, aluminum oxide, aluminum oxide hydrate, tin oxide, titanium dioxide, zirconium oxide, iron(III) oxide and chromium(III) oxide, preference being given to silicon oxide and aluminum oxide.

Layer (C) can also be a phosphate-, chromate- and/or vanadate-containing or else phosphate- and $SiO_2$-containing layer obtained by gas phase passivation (EP-A-595 131 and DE-A-4,414,079, which was unpublished at the priority date of the present invention), which also makes it possible in particular to use the luster pigments of the present invention comprising a substantially metallic layer (B) in waterborne coatings or other aqueous systems.

The thickness of the layer (C) is generally from about 1 to 400 nm, preferably from 5 to 250 nm.

Of course, layer (C) may likewise contribute to the interference of the pigment and continue the interference series at the point determined by the substrate coated with (A) and (B). This is the case, for example, when zirconium oxide or titanium oxide is applied as layer (C). If, in contrast, layer (C) consists essentially of silicon oxide, this layer will be hardly coloristically noticeable in the application medium (eg. paints or inks) which has a similar refractive index.

Finally, colored metal oxides such as iron oxide and chromium oxide will with their absorption color modify, and with increasing thickness ultimately obscure, the interference color of the multilayer system.

The luster pigments of this invention are noticeable for the uniform, homogeneous and filmlike construction of their interference-capable coating, which covers the substrate platelet on all sides, and not only on the upper and lower surfaces.

They exhibit very intensive and extremely angle-dependent interference colors which, given the transparency of the substrate particles, could not have been expected.

Unlike the known strongly reflecting goniochromatic luster pigments with a metallic base, the luster pigments of this invention remain transparent to visible light, ie. they have different (complementary) interference colors in reflected and transmitted light, but are noticeable for high hiding powder, despite their transparency.

In addition, in a varnish, they do not exhibit the "harsh" metallic luster typical of metallic luster pigments, but a softer luster seemingly from deep within the viewed object, which is why they also create the illusion of spatial depth when applied.

The luster pigments of this invention are preferably produced by multiple coating of the substrate platelets via gas phase decomposition of volatile metal compounds (CVD) or wet-chemically via hydrolytic decomposition of organic metal compounds, in particular.

The wet-chemical and the CVD route are equally suitable for producing the silicon oxide and/or aluminum oxide layers (B).

In the wet-chemical variant, described in DE-A-4,405,492, unpublished at the priority date of the present invention, organic silicon and/or aluminum compounds in which the organic radicals are bonded to the metals via oxygen atoms are hydrolyzed in the presence of the substrate particles and of an organic solvent in which the metal compounds are soluble and which is miscible with water.

The preferred embodiment is the hydrolysis of the metal alkoxides (especially tetraethoxysilane and aluminum triisopropoxide) in the presence of an alcohol (especially isopropanol) and of aqueous ammonia as catalyst.

A preferred procedure comprises charging substrate particles, isopropanol, water and ammonia initially, heating this mixture to from 40° C. to 80° C., in particular to from about 60° C. to 70° C., with stirring, and continuously metering in a solution of the metal alkoxide in isopropanol. Following a subsequent stirring time of usually from about 1 to 15 h, the mixture is cooled down to room temperature and the coated pigment is isolated by filtration, washing and drying.

In the CVD variant, described in DE-A-4,437,752, unpublished at the priority date of the present invention, silanes which contain at least one alkanoyloxy radical are decomposed in the gas phase with water vapor and, if the silanes also contain alkyl or phenyl radicals, oxygen in the presence of agitated substrate particles.

Preferred silanes have alkoxy and alkanoyloxy radicals, particular preference being given to di-tert-butoxydiacetoxysilane.

To carry out the CVD variant, it is advisable, as is generally the case with CVD processes, to use a fluidized bed reactor as described for example in EP-A 45 851. The substrate particles are heated in the reactor to the desired reaction temperature (generally from 100 to 600° C., preferably from 150 to 300° C.) under fluidization with an inert gas such as nitrogen, and silane and water vapor (and also, if appropriate, oxygen) are then introduced with the aid of inert carrier gas streams (advantageously part-streams of the fluidizing gas) from upstream vaporizer vessels via separate nozzles, advantageously maintaining the concentration of the silane at $\leq 5\%$ by volume, preferably $\leq 2\%$ by volume, based on the total amount of gas in the reactor. The amount of water vapor should correspond at least to the amount stoichiometrically required for hydrolysis of the silane, but preference is given to an amount of from 10 to 100 times that amount.

Layers (B) are preferably produced by the CVD process, under reaction conditions which differ with the desired layer material. As is known from WO-A-93/12182, metallic layers (B) are preferably applied by decomposition of metal carbonyls such as iron pentacarbonyl, chromium hexacarbonyl, molybdenum hexacarbonyl, tungsten hexacarbonyl, nickel tetracarbonyl and/or dicobalt octacarbonyl at from 70 to 350° C. under inert conditions. The particularly preferred $Mo(CO)_6$ is ideally decomposed at temperatures from 200 to 250° C.

Aluminum layers (B), as described in German Patent Application 19516181.5, can be deposited by inert gas phase decomposition of organoaluminums, especially aluminum alkyls or alkylamine adducts of aluminum hydrides.

Suitable aluminum alkyls besides monoalkylaluminum hydrides and halides are preferably dialkylaluminum hydrides and halides and in particular aluminum trialkyls, especially for example triethylaluminum and trimethylaluminum.

Aluminum layers (B) are advantageously applied by charging the aluminum alkyl to a vaporizer vessel which is disposed upstream of the coating reactor and which has been heated stepwise to about 100–150° C., in the form of a solution in a low volatile hydrocarbon such as petroleum, transferring the aluminum alkyl by means of an inert gas stream (eg. argon or in particular nitrogen) passed through this solution into the reactor, via a preferably temperature-controlled nozzle, and thermally decomposing it in the reactor, generally at from 100 to 500° C., preferably at from 150 to 400° C., for which the gas quantity of the volatile aluminum compound should generally not exceed 2% by volume, preferably 1% by volume, of the total amount of gas in the reactor.

The preferred reactor is in particular the abovementioned fluidized bed reactor, but it is also possible to use a single-neck, round-bottom flask made of quartz glass which is rotated by a motor, provided with gas inlet and outlet lines in the axis of rotation, and heated by a clamshell oven, the gross assembly amounting to a rotary sphere furnace. In principle, the reactor used can be any heatable mixer which agitates the substrate particles gently by means of appropriate internal fitments and permits the supply and removal of gas. For a continuous process on an industrial scale it is also possible to use, for example, a rotary tube furnace to which the substrate particles and the aluminum alkyl/inert gas mixture are fed continuously.

Metallic layers (B) can finally also be applied wet-chemically by reduction of suitable metal salt solutions. In this way it is possible to deposit in particular nobler metals such as in particular silver, but also copper, gold, cobalt, nickel, palladium and platinum. As described in EP-A-353 544, a number of reductants are suitable for this purpose, especially mild organic reductants, for example sugars such as glucose and dextrose, but also formaldehyde.

Generally, however, the metal layers applied from the gas phase will be preferable to the wet-chemically applied ones because of their higher quality (more finely crystalline, filmlike), since they usually produce more brilliant and stronger luster pigments. The CVD deposition of nonselectively absorbing layers (B) consisting essentially of lower metal oxides (eg. $Fe_3O_4$, $VO_2$, $V_2O_3$) is likewise known from WO-A-93/12182. Here the metal carbonyls such as iron pentacarbonyl or oxychlorides such as vanadium oxychloride are decomposed with water vapor. If the gas phase decomposition initially gives rise to higher metal oxides such as $V_2O_5$, these have to be subsequently reduced, for example with hydrogen or ammonia, to the desired oxide.

As described in EP-A-579 091 and German Patent Application 19515988.8, nonselectively absorbing metal-sulfide-containing layers (B) can be applied to the (A)-coated substrate particles by initially depositing a metal or metal oxide layer, preferably by gas phase decomposition of volatile metal compounds in the presence of an inert gas or of oxygen and/or water vapor, and then converting this metal or metal oxide layer by reaction with a volatile sulfur-containing compound or with sulfur vapor into the desired metal-sulfide-containing layer (B), or depositing the layer (B) directly by gas phase decomposition of volatile metal compounds in a sulfur-containing atmosphere.

As well as the sulfur-containing organic compounds mentioned in EP-A-579 091, preferred sulfur donors include in particular hydrogen sulfide and especially sulfur itself.

If elementary sulfur is used, an advantageous procedure comprises charging finely ground sulfur powder together with the substrate material to the reactor, inertizing for from about 1 to 4 h, and then heating to the reaction temperature (in general from 200 to 500° C., preferably from 300 to 500° C., particularly preferably from 400 to 450° C.) in the absence of oxygen.

Suitable reactors include the reactors mentioned for the coating with aluminum.

Any residual sulfur present is easily removed by sublimation in an inert gas stream. Generally, however, this will not be necessary, since the sulfur is converted quantitatively (up to the amount stoichiometrically required to form the metal sulfide) and therefore can easily be added in the amount corresponding to the sulfide content desired for layer (B). Preference is given to using sufficient sulfur for the preferred metallic or else oxidic starting layer to be at least covered by an uninterrupted dense sulfide layer which renders further passivation unnecessary. The region of layer (B) on the inside (closer to the substrate) can be virtually free of sulfide and consist essentially only of the respective metal or metal oxide.

Similarly, selectively absorbing layers (B) consisting essentially of colored metal oxides and/or metal nitrides are suitably producible using in particular CVD processes already described.

For instance, the deposition of α-iron(III) oxide, chromium(III) oxide and titanium(III) oxide by oxidative decomposition of iron pentacarbonyl and chromium hexacarbonyl or hydrolytic decomposition of titanium tetraisopropoxide or titanium tetrachloride and the subsequent reduction of the resulting titanium dioxide with hydrogen or with ammonia and also ammonia-propane mixtures, at which point $Ti_2O_3$ (beside $TiO_2$) is present in a mixture with titanium oxynitrides and nitrides (and also possibly carbon), are well known (EP-A-33 457, EP-A-338 428, German Patent Applications 19511696.8 and 19511697.6).

Wet-chemically, α-$Fe_2O_3$ and $Cr_2O_3$ layers could be applied by hydrolytic decomposition of iron(III) salts such as iron(III) chloride and sulfate and chromium(III) chloride and subsequent conversion of the resulting hydroxide-containing layers into the oxide layers by tempering. Similarly, $Ti_2O_3$ coating could be achieved by hydrolysis of $TiCl_4$ and subsequent reduction of the resulting $TiO_2$ with hydrogen or ammonia.

The coating with selectively absorbing γ-$Fe_2O_3$ (B) can be carried out by the CVD process variants described in DE-A-4,340,141 by first decomposing $Fe(CO)_5$ in the presence of water vapor to deposit a magnetite film, which is subsequently oxidized with air to γ-$Fe_2O_3$, or first oxidatively decomposing $Fe(CO)_5$ to deposit an α-$Fe_2O_3$ film, which is subsequently reduced with hydrogen to iron(II)-containing products and subsequently oxidized with air to γ-$Fe_2O_3$.

Vanadium(V) oxide layers (B) can finally be deposited by gas phase decomposition of vanadium oxychloride with water vapor.

For the production of added-colorant $TiO_2$ layers (B), reference is made to DE-A-4,437,753, which was unpublished at the priority date of the present invention.

Outer protective layers (C) consisting essentially of colorless or selectively absorbing metal oxides can be produced according to the already described processes by oxidative or hydrolytic gas phase decomposition of the metal carbonyls or metal alkoxides or wet-chemically by hydrolysis of organic metal compounds (silicon, aluminum) or inorganic metal salts.

Phosphate-, chromate- and/or vanadate-containing and also phosphate- and $SiO_2$-containing outer layers (C) can be applied by the passivating processes described in EP-A-595 131 and DE-A-4,414,079, which was unpublished at the priority date of the present invention by hydrolytic or oxidative gas phase decomposition of oxide halides of the metals (eg. $CrO_2Cl_2$, $VOCl_3$), in particular of phosphorus oxyhalides (eg. $POCl_3$), phosphoric and phosphorous esters (eg. di- and trimethyl and -ethyl phosphite) and of amino-containing organosilicons (eg. 3-aminopropyltriethoxy- and -trimethoxy-silane).

Luster pigments which are particularly stable in aqueous systems are obtained from a combined decomposition of the phosphorus and silicon compounds.

The luster pigments of this invention are advantageously useful for many purposes, such as the coloring of plastics, glasses, ceramic products, decorative cosmetic preparations and in particular coatings, especially automotive coatings, and inks, especially security printing inks. All customary printing processes can be employed, for example screen printing, intaglio printing, bronze printing, flexographic printing and offset printing.

The pigments of this invention are also advantageously useful for these purposes in admixture with transparent and hiding white, colored and black pigments and also conventional transparent, colored and black luster pigments based on metal-oxide-coated mica and metal pigments, platelet-shaped iron oxides, graphite, molybdenum sulfide and platelet-shaped organic pigments.

EXAMPLES

Preparation and application of luster pigments according to this invention

To incorporate the pigments into a paint, 0.4 g of each pigment was stirred into 3.6 g of a mixed-polyester varnish having a solids content of 21% by weight and the mixture was dispersed in a Red Devil for 2 min. Drawdowns of the pigmented varnishes were knife-coated onto black and white cardboard at a wet film thickness of 160 μm.

Example 1

100 g of a silvery $TiO_2$-coated mica pigment (IRIODIN® 103 Rutile Sterling Silver; Merck) were inertized in a rotary sphere furnace by passing 50 l/h nitrogen thereover for 1 h. After heating to 600° C., 20 l/h of hydrogen were introduced for 2 h. On completion of the reduction, the contents were cooled down to room temperature under renewed flushing with nitrogen.

After the reduction, the originally white pigment exhibited a silvery body color and better hiding power.

In a round-bottom flask equipped with reflux condenser and stirrer, the reduced mica pigment was suspended in 800 ml of isopropanol. After addition of 300 ml of water and 30 ml of 25% strength by weight aqueous ammonia solution, the suspension was heated to 60° C. with vigorous stirring. At the same time the metered addition was commenced of a mixture of 200 ml of isopropanol and 400 g of tetraethoxysilane (rate of addition 100 ml/h, 6 h). Following a subsequent stirring time of 2 h and cooling of the suspension, the product was filtered off, thoroughly washed with isopropanol and dried at 80° C.

In air the dried $SiO_2$-coated pigment exhibited a pale blue interference color in plan view, which flopped into a pale red at flatter viewing angles.

210 g of the $SiO_2$-coated mica pigment were then heated in a fluidized bed reactor at 220° C. under fluidization with a total of 600 l/h of nitrogen. From a hot upstream vessel at 60° C., 32.3 g of molybdenum hexacarbonyl were additionally carried during 8 h, by a nitrogen stream of 400 l/h, into the reactor and decomposed therein into molybdenum and carbon monoxide. On completion of the molybdenum deposition, the fluidizing gases were admixed with some air in the course of the cooling to passivate the molybdenum surface.

In varnish the molybdenum-coated pigment exhibited an intensive, greenish blue interference color in plan view, which flopped via pure blue toward violet at flatter viewing angles.

100 g of the Mo-coated pigment were then mixed with 2.5 g of finely ground sulfur powder, initially inertized in a rotary sphere furnace with 30 l/h of nitrogen for 1 hour, and then heated to 500° C. in the course of about 30 min under a nitrogen stream of 5 l/h. After 2 h the contents were cooled down to room temperature under nitrogen.

The pigment obtained had a titanium content of 7.5% by weight, a silicon content of 30.5% by weight, a molybdenum content of 3.6% by weight and a sulfur content of 0.96% by weight. On application, it exhibited an intensive, bluish green interference color in plan view, which flopped via violet toward red with increasing flatness of the viewing angle.

Example 2

Example 1 was repeated except that the 100 g of the silvery $TiO_2$-coated mica pigment were reduced with hydrogen at 800° C. After reduction, the pigment likewise exhibited a silvery body color and improved hiding power compared with the pigment of Example 1.

100 g of the reduced pigment were coated with $SiO_2$ similarly to Example 1 by suspending in 100 ml of isopropanol and admixing initially with 400 ml of water and 40 ml of 25% strength by weight ammonia and then over 9 h with a mixture of 300 ml of isopropanol and 600 g of tetraethoxysilane. The subsequent stirring time was 14 h.

In air the dried $SiO_2$-coated pigment (268 g) exhibited a bluish violet shimmer in plan view, which became a red shimmer at flatter viewing angles.

185 g of the $SiO_2$-coated pigment were then coated with molybdenum using 27.5 g of $MO(CO)_6$ over 6 h analogously to Example 1.

In varnish the Mo-coated pigment exhibited an intensive, blue interference color in plan view, which flopped toward violet at flatter viewing angles.

100 g of the Mo-coated pigment were then reacted with 4.5 g of sulfur powder similarly to Example 1.

The pigment obtained had a Ti content of 6.0% by weight, an Si content of 31% by weight, an Mo content of 3.3% by weight and an S content of 1.7% by weight. On application it exhibited an intensive, reddish blue interference color in plan view, which flopped via red toward gold with an increasingly flat viewing angle.

Example 3

150 g of the silvery $TiO_2$-coated mica pigment were coated with $SiO_2$ similarly to Example 1 by suspending in 150 ml of isopropanol and admixing initially with 500 ml of water and 50 ml of 25% strength by weight ammonia and then over 7 h with a mixture of 375 ml of isopropanol and 750 g of tetraethoxysilane (rate of addition 160 ml/h). The subsequent stirring time was 1 h.

The dried $SiO_2$-coated pigment (352 g) retained its white body color and exhibited in air a pale, red interference color at flat viewing angles only against a black background.

310 g of the $SiO_2$-coated pigment were then coated with molybdenum using 49.8 g of $Mo(CO)_6$ over 15 h similarly to Example 1.

In varnish the Mo-coated pigment exhibited an intensive, red interference color in plan view, which flopped via reddish gold toward greenish gold with increasing flatness of the viewing angle.

100 g of the Mo-coated pigment were then reacted with sulfur powder analogously to Example 1.

The pigment obtained had a Ti content of 8.4% by weight, an Si content of 27.4% by weight, an Mo content of 4.6% by weight and an S content of 1.2% by weight. On application it exhibited an intensive, bluish red interference color in plan view, which flopped via red toward gold with increasing flatness of the viewing angle.

Example 4

150 g of a bluish silvery, ammonia-reduced, $TiO_2$-coated mica pigment (PALIOCROM® Blue Silver L 6000; BASF) were coated with $SiO_2$ analogously to Example 1 by suspending in 1500 ml of isopropanol and admixing initially with 500 ml of water and 50 ml of 25% strength by weight ammonia and then over 7 h with a mixture of 300 ml of isopropanol and 600 g of tetraethoxysilane. The subsequent stirring time was 14 h.

In air the dried $SiO_2$-coated pigment (312 g) exhibited an intensively blue interference color in plan view, which flopped toward violet at flatter viewing angles.

300 g of the $SiO_2$-coated pigment were then coated with molybdenum using 30 g of $Mo(CO)_6$ over 7 h similarly to Example 1.

The pigment obtained had a Ti content of 7.7% by weight, an Si content of 29.6% by weight and an Mo content of 2.6% by weight. On application it exhibited an intensive, blue interference color in plan view, which flopped toward violet at flatter viewing angles.

Example 5

2 g of the $SiO_2$-coated pigment of Example 2 were suspended in 100 ml of water. Following addition of 1 g of dextrose, the pH of the suspension was adjusted to 9 with 2% strength by weight ammonia. Following addition of a solution of 0.2 g of silver nitrate in 50 ml of water, the suspension was heated to 40° C. and stirred at that temperature for 2 h and at room temperature for a further 15 h. The product was filtered off, washed first with water and then with acetone and dried at room temperature.

The pigment obtained had a Ti content of 7.4% by weight, an Si content of 34.4% by weight and a silver content of 6.6% by weight. On application in varnish it exhibited a grayish blue color in plan view, which shifted via red toward green with increasing flatness of the viewing angle.

Example 6

150 g of a coppery, aluminum- and manganese-doped, platelet-shaped α-iron(III) oxide pigment (2.2% by weight of aluminum, 0.3% by weight of manganese, each based on the total pigment; average particle diameter 18 μm; prepared similarly to Example 1 of EP-A-265 280, but with 10 times the batch in a 3.5 l autoclave) were coated with $SiO_2$ similarly to Example 1 by suspending in 1200 ml of isopropanol and admixing initially with 500 ml of water and 50 ml of 25% strength by weight ammonia and then over 5 h with 500 g of tetraethoxysilane. The subsequent stirring time was 2 h.

In air the dried $SiO_2$-coated pigment (280 g) exhibited a red interference color in plan view, which flopped toward greenish gold at flatter viewing angles.

120 g of the $SiO_2$-coated pigment were then heated to 190° C. in a fluidized bed reactor under fluidization with 400 l/h of nitrogen. In addition, 300 l/h of nitrogen, loaded with water vapor by passing it through a water reservoir temperature-controlled to 40° C., and also 200 l/h of air were introduced via two further nozzles on the side. From a room temperature reservoir, 120 g of iron pentacarbonyl were carried during 12 h into the reactor with a further 300 l/h of nitrogen and decomposed therein to α-$Fe_2O_3$.

The pigment obtained had an Si content of 18.4% by weight and a total iron content of 37.5% by weight. On application it exhibited a greenish interference color in plan view, which flopped via blue toward red with increasing flatness of the viewing angle.

We claim:

1. A goniochromatic luster pigment comprising:
    a multiply coated, nonmetallic, platelet-shaped substrate having a refractive index n≧2, and being at least partially transparent to visible light, the substrate being coated by at least one layer packet comprising:
    A) a colorless coating having a refractive index n≦1.8, and
    B) a reflective, selectively or non-selectively absorbing coating which is at least partially transparent to visible light.

2. The goniochromatic luster pigment of claim 1 which further comprises:
    C) an outer protective layer.

3. The goniochromatic luster pigment of claim 1, wherein the platelet-shaped substrate consists essentially of:
    silicatic platelets coated with a layer having a refractive index n≦2, and being at least partially transparent to visible light, or of
    platelet-shaped iron oxides.

4. The goniochromatic luster pigment of claim 1, wherein the platelet-shaped substrate consists essentially of mica platelets coated with high refractive metal oxides.

5. The goniochromatic luster pigment of claim 1, wherein said coating A) consists essentially of metal oxides, magnesium fluoride or a mixture thereof.

6. The goniochromatic luster pigment of claim 1, wherein said coating A) consists essentially of silicon oxide, silicon oxide hydrate, aluminum oxide, aluminum oxide hydrate or mixtures thereof.

7. The goniochromatic luster pigment of claim 1, wherein said coating B) consists essentially of metals, metal oxides, metal sulfides, metal nitrides or mixtures thereof.

8. The goniochromatic luster pigment of claim 2, wherein the protective layer C) consists essentially of colorless or selectively absorbing metal oxides.

9. The goniochromatic luster pigment of claim 3, wherein platelet-shaped substrate consists essentially of silicatic platelets coated with a layer having a refractive index n, which is ≧2.4.

10. The goniochromatic luster pigment of claim 1, wherein said substrate transmits at least 10% of incident light.

11. The goniochromatic luster pigment of claim 10, wherein said substrate transmits at least 30% of incident light.

12. The goniochromatic luster pigment of claim 4, wherein the platelet-shaped substrate consists essentially of mica platelets having an oxide coating consisting essentially of $TiO_2$.

13. The goniochromatic luster pigment of claim 12, wherein said $TiO_2$ coating has a thickness of from 10 to 300 nm.

14. The goniochromatic luster pigment of claim 2, wherein said outer protective layer C) consists essentially of silicon oxide, silicon oxide hydrate, aluminum oxide, aluminum oxide hydrate, tin oxide, titanium dioxide, zirconium oxide, iron (III) oxide, chromium (III) oxide or mixtures thereof.

15. The goniochromatic luster pigment of claim 14, wherein said outer protective layer C) consists essentially of silicon oxide, aluminum oxide or a mixture thereof.

16. The goniochromatic luster pigment of claim 1, wherein said coating A) has a thickness of from 20 to 800 nm, with the provisio that for a single layer packet (A)+(B), a minimum thickness of said coating A) is about 100 nm.

17. The goniochromatic luster pigment of claim 1, having 2, 3, or 4 layer packets of (A)+(B).

18. The goniochromatic luster pigment of claim 7, wherein said coating B) comprises aluminum and has a thickness of about 1 to 25 nm.

19. The goniochromatic luster pigment of claim 1, wherein said coating B) is a non-selectively absorbing coating consisting essentially of metals, black metal oxides or sulfides and having a thickness of about 1 to 100 nm.

20. The goniochromatic luster pigment of claim 1, wherein said coating B) is a colored metal oxide coating having a thickness of about 1 to 500 nm.

21. The goniochromatic luster pigment of claim 1, wherein said substrate is silvery $TiO_2$-coated mica, said coating A) is $SiO_2$ and said coating B) is molybdenum, molybdenum sulfide or α-$Fe_2O_3$.

22. A method of coloring paints, inks plastics, glasses, ceramic products or decorative cosmetic preparations, comprising adding the goniochromatic luster pigments of claim 1 thereto.

23. The goniochromatic luster pigment of claim 1, wherein the platelet-shaped substrate consists essentially of iron oxide platelets.

24. The goniochromatic luster pigment of claim 1, wherein the platelet-shaped substrate consists essentially of mica platelets coated with partially reduced $TiO_2$.

25. A The goniochromatic luster pigment of claim 8, wherein the protective layer C) contains phosphate, chromate or vanadate.

26. The goniochromatic luster pigment of claim 8, wherein the protective layer C) consists essentially of colorless or selectively absorbing metal oxides, the protective layer C) further containing phosphate, chromate or vanadate.

* * * * *